US006207620B1

(12) United States Patent
Gonzalez et al.

(10) Patent No.: US 6,207,620 B1
(45) Date of Patent: Mar. 27, 2001

(54) USE OF ENCAPSULATED ACID IN ACID FRACTURING TREATMENTS

(75) Inventors: Manuel E. Gonzalez, Kingwood; Mark D. Looney, Meadows Place, both of TX (US)

(73) Assignee: Texaco Inc., White Plains, NY (US)

( * ) Notice: Subject to any disclaimer, the term of this patent is extended or adjusted under 35 U.S.C. 154(b) by 0 days.

(21) Appl. No.: 09/326,228

(22) Filed: Jun. 4, 1999

(51) Int. Cl.$^7$ .................................................. C09K 3/00
(52) U.S. Cl. ......................... 507/277; 507/267; 507/902; 507/923; 507/933; 166/307
(58) Field of Search ............................. 166/307; 507/277, 507/902, 923, 933, 267

(56) References Cited

U.S. PATENT DOCUMENTS

| | | | |
|---|---|---|---|
| 4,249,609 | * 2/1981 | Haafkens et al. | 166/307 |
| 4,359,391 | * 11/1982 | Salathiel et al. | 166/307 |
| 4,713,251 | * 12/1987 | Seighman | 426/96 |
| 4,919,209 | * 4/1990 | King | 507/902 |
| 4,923,753 | * 5/1990 | Walles et al. | 507/902 |
| 5,103,905 | 4/1992 | Brannon et al. | 166/250 |
| 5,110,486 | * 5/1992 | Manalastas et al. | 507/902 |
| 5,217,074 | 6/1993 | McDougall et al. | 166/300 |
| 5,238,067 | * 8/1993 | Jennings, Jr. | 166/307 |
| 5,370,184 | 12/1994 | McDougall et al. | 166/278 |
| 5,373,901 | 12/1994 | Norman et al. | 166/307 |
| 5,381,864 | 1/1995 | Nguyen et al. | 166/280 |
| 5,437,331 | 8/1995 | Gupta et al. | 166/300 |
| 5,492,178 | 2/1996 | Nguyen et al. | 166/276 |
| 5,591,700 | 1/1997 | Harris et al. | 507/204 |
| 5,604,186 | 2/1997 | Hunt et al. | 507/204 |
| 5,645,714 | 7/1997 | Strand et al. | 208/391 |
| 5,678,632 | 10/1997 | Moses et al. | 166/307 |
| 5,680,900 | 10/1997 | Nguyen et al. | 166/295 |
| 5,723,042 | 3/1998 | Strand et al. | 208/391 |
| 5,759,599 | 6/1998 | Wampler et al. | 426/89 |
| 5,813,466 | 9/1998 | Harris et al. | 166/300 |
| 5,837,656 | 11/1998 | Sinclair et al. | 507/220 |
| 5,922,652 | * 7/1999 | Kowalski et al. | 507/902 |

OTHER PUBLICATIONS

B.B. Williams, J. L. Gidley, R. S. Schechter "Acidizing Fundamentals", Monograph vol. 6 SPE, Henry L. Doherty Series; Chapter 2, pp. 5–18, No Date Available.

B.B. Williams, J. L. Gidley, R. S. Schechter "Acidizing Fundamentals", Monograph vol. 6 SPE, Henry L. Doherty Series, Chapter 5, pp. 29–37, No Date Available.

B.B. Williams, J. L. Gidley, R. S. Schechter "Acidizing Fundamentals", Monograph vol. 6 SPE, Henry L. Doherty Series, Chapter 7, p. 59, No Date Available.

* cited by examiner

Primary Examiner—Philip Tucker
(74) Attorney, Agent, or Firm—Morris N. Reinisch; Howrey Simon Arnold & White

(57) ABSTRACT

A method of fracturing a subterranean formation, in which subterranean formation being in fluid communication with the surface includes creating a fracture in said subterranean formation, said fracture having more than one fracture faces; and injecting into said fracture an encapsulated formation etching agent, wherein said encapsulated formation etching agent includes a formation etching agent and an encapsulating agent and wherein said formation etching agent etches the fracture faces of the fracture so as to form a flow channel in said formation. The formation etching agent may be selected from mineral acids and mixtures thereof, organic acids and mixtures thereof, mineral acids and mixtures of mineral acids mixed with gelling agent, organic acids and mixtures of organic acids mixed with gelling agent, water soluble hydroxides and mixtures of water soluble hydroxides, and water soluble hydroxides and mixtures of water soluble hydroxides mixed with gelling agent. The encapsulating agent may be a natural and synthetic oils, natural and synthetic polymers and enteric polymers and mixtures thereof.

18 Claims, No Drawings

USE OF ENCAPSULATED ACID IN ACID FRACTURING TREATMENTS

BACKGROUND OF THE INVENTION

Acid fracturing is a widely used technique for increasing the production of oil from a well that penetrates an underground limestone or dolomite hydrocarbon bearing formation. Typically during an acid fracturing treatment, a pad fluid is rapidly injected into the formation so as to create a buildup in wellbore pressure sufficient to overcome compressive stresses and tensile strength of the rock formation. When subjected to a sufficient pressure, the rock fails allowing a crack, also referred to as a fracture, to form in the formation. Continued fluid injection often increases the fracture's length, height and width. Acid is then injected into the fracture and the acid chemically reacts with the face of the fracture. The reaction of the acid with face of the fracture etches the face so that when the fracture closes flow channels are created that extend deep into the formation. If the acid fracturing treatment is properly done, these flow channels remain open when the well is placed back on production, thus increasing the productive capacity of the well.

Increased production of oil, also known as stimulation of the well, is achieved by either creating a flow path through a damaged zone around the well bore or by altering the flow pattern in the reservoir. Typically small volume acid treatments can overcome well bore damage and restore native productivity to a well by removing flow restrictions caused by a zone of low permeability near the wellbore. However in order to alter the flow pattern in the reservoir, a much larger volume acid treatment process is typically required.

Practical and economic formation stimulation requires the proper selection of acid type as well as the acidizing technique utilized. Acid systems currently in use can be broadly classified into the following groups: mineral acids which includes hydrochloric acid, hydrofluoric acid and mixtures of hydrochloric-hydrofluoric acid; organic acids which include formic acid; and acetic acid; powdered solid acids such as sulfamic acid, and chloroacetic acid; mixed acid systems such as acetic-hydrochloric acid, formic-hydrochloric acid; formic-hydrofluoric acid; retarded acid systems for example gelled acids, chemically retarded acids, and emulsified acids. All of these different acid systems with the exception of hydrochloric acid-hydrofluoric acid and formic-hydrofluoric acid mixtures are used to stimulate carbonate formations.

The distance that reactive acid moves along a fracture during treatment is called the acid penetration distance. The acid penetration distance is one of the variables that will determine the success or failure of the treatment. The acid penetration distance may be effected by the fluid loss characteristics of the acid, the width of the fracture, the rate of acid reaction with the formation rock, the temperature of the acid and the surrounding formation, and the acid flow rate along the fracture. The effective acid penetration is not necessarily the penetration of the acid fluid that is being pumped. It is the penetration achieved before the fluid turns neutral (through reaction with the fracture wall) and loses it's ability to etch the entire remaining length of the fracture.

The fluid loss characteristics of any particular fluid depends upon the porosity of the formation, the viscosity of the fluid and the presence or absence of any fluid loss control agents in the fluid. Generally, fluid loss to the formation increases with increasing formation porosity, decreases with increasing fluid viscosity (i.e. the more viscous the lower the fluid loss) and decreases with the presence of fluid loss control agents such as barite, humates, polymer resins and the like. When acid enters a fracture it reacts with the fracture walls and in doing so eliminate the filtercake created by fluid loss additives used in the pad fluid. Once this occurs the fracture geometry will be controlled by the fluid loss characteristics of the acid. It has been reported in the literature that the use of an effective fluid loss additive in the acid is critical to maximizing the acid penetration distance. Fluid loss control of acid in carbonates is generally much more difficult to obtain than with sandstone formation because the acid continuously dissolves the rock matrix that supports the fluid-loss additive.

It is reported in the literature that generally, an increase in fracture width normally will increase the distance reactive acids will penetrate along the fracture, (i.e. the acid penetration distance. One example given shows that an increase in the fracture width from 0.05 to 0.20 inches can increase the acid penetration distance from 80 to 175 ft. in a limestone formation. Thus being able to keep the fracture open for the longest possible time is important to the success of the acid treatment. The difficulty in keeping a fracture open is that as the acid dissolves the formation in close proximity to the well, and thus increased volumes of fluid are needed to maintain the pressure necessary to keep the fracture open. Thus the interrelationship between the rate of fluid lose to the formation (fluid loss characteristics) and the ability to keep a fracture open. Generally the distance reactive acid will penetrate along a fracture will increase with an increase in the flow velocity of the acid along the fracture. An increase in injection rate also can also reduce the temperature at which the acid enters the fracture, thus increasing the acid penetration distance by reducing the reaction rate.

The temperature of the fluid in the fracture has a significant influence on the geometry and acid penetration distance. Generally it is not accurate to assume that the temperature of the fluid being injected is approximately that of the formation after it enters the formation. Because of the differences in heat capacity and fluid loss characteristics, the temperature within the fracture will depend on whether or not a pad fluid is used and if so the characteristics of the pad fluid. Generally fluids with a low viscosity and a high rate of fluid loss from the formation can effectively cool the formation surrounding the fracture. However, because of the high rate of fluid loss, the fracture is likely to be narrow and will require large volumes of fluid in order to increase fracture length. Fluids of this type are often used as pre-cooling pad fluids to reduce the temperature of the fracture and thus increase acid penetrations distance.

Viscous fluids with low fluid loss to the formation typically do not cool the formation as much as a less viscous fluid. Under such circumstances the fluid in the fracture will be approximately that of the formation. In cases in which the acid reacts rapidly with the formation, the temperature has little effect on the acid penetration distance because the rate of reaction is controlled by the mass transport of the acid to the formation face. However, with slower reactions, the acid penetration distance will vary more with temperature.

It should be understood by one of skill in the art that acids tend to react faster with limestone formations than with dolomite formations. The primary reason for this is the difference in the chemical composition of the two different types of rock. At low formation temperatures it is reported in the literature that acid penetration distance will be greater for dolomite than for a limestone formation. In contrast, due to the higher the reaction rate the acid penetration distance in a limestone formation is independent of temperature.

The selection of the acid utilized during the acid treatment of the formation can have a significant impact on the outcome of the treatment. If the fluid loss rate of an acid can be controlled, it is sometimes possible to use a reduced reactivity (i.e. retarded) acid to maximize the acid penetration distance. Acids may be retarded for acid fracturing purposes only if their reaction rate during flow along the fracture is significantly lower than the reaction rate of hydrochloric acid alone.

There are several types of retarded acid systems known in the art including: viscous acid systems, gelled acid systems, chemically retarded acid systems, and organic acid systems. Viscous acids include emulsified acids and acids gelled with guar or other polymers. Typically the acid (28% hydrochloric acid) is mixed with kerosene or other suitable oil to form either an acid external phase emulsion or an acid internal phase emulsion. The retardation provided by emulsified acids is primarily a result of the high emulsion viscosity, which reduces the rate of mass transfer to the fracture wall. Shielding by the oil layer may also provide a measure of reduction in the reaction rate. When viscous acids are used often very large volumes of fluid are needed in order to assure adequate fracture conductivity. Gelled acids are commonly prepared by adding polymers such a guar, gum karaya or polyacrylamide to hydrochloric acid. The resulting viscous acid is retarded so long as the fluid is viscous. Unfortunately, the viscosity of the gelled acid is quickly lost because the gelling agent typically degrades due to elevated temperature encountered in the well bore and the formation. The highly temperature dependent nature of gelled acid often makes it use undesirable from a field operation and cost effectiveness viewpoint. Chemically retarded acids such as those containing oil wetting surfactants have been reported as being effective in reducing the reactivity of hydrochloric acid in laboratory tests. However, at typical field flow rates, the retarding effect of the oil wetting surfactants is not realized and the acid reacts as would regular hydrochloric acid.

Organic acids such as acetic acid and formic acid have been use either alone or in mixtures with hydrochloric acid. These mixtures of acids have been reported as being useful as retarded acid systems. Generally the reaction rate for organic acids is lower than for hydrochloric acid. However, the penetration distance for acetic acid or formic acid are similar to conventional hydrochloric acid.

In summary of the above, acid fracturing remains a technology in which there exists a continuing need for new and improved methods for delivery of the acid to the formation and controlling the reaction of the acid within the formation.

SUMMARY OF THE INVENTION

The present invention is generally directed to a method of increasing the production of hydrocarbon fluids from a hydrocarbon fluid bearing subterranean formation, the formation being in fluid communication with the surface by way of a well. In one illustrative embodiment the method includes the steps of: injecting into said formation a pad fluid by way of said well; pressurizing said pad fluid so as to create open fractures in said subterranean formation, said fractures having one or more fracture faces; injecting into said open fractures a formation treating composition, said formation treating composition including an encapsulated formation etching agent and a carrier fluid, said encapsulated formation etching agent including a formation etching agent being encapsulated by an encapsulating agent and wherein said formation etching agent being capable of etching the fracture faces of said formation; shutting-in said well for a sufficient time so as to allow said formation treating agent to be released (in the entire fracture faces) from said encapsulating agent thus etching the entire fracture faces and giving etched fracture faces; and depressurizing said fluid so as to close the open fractures thus forming one or more flow channels, said flow channels being defined by the etched fracture faces, wherein said flow channels increase the production of hydrocarbon fluids from said hydrocarbon fluid bearing subterranean formation. The carrier fluid being made from either a neutral liquid/gas/emulsion (water or oil based) or a mixture thereof, or an etching agent (acid-based). A wide variety of chemicals may be used for the etching agent such as mineral acids and mixtures thereof, organic acids and mixtures thereof, mineral acids and mixtures of mineral acids mixed with gelling agent, organic acids and mixtures of organic acids mixed with gelling agent, water soluble hydroxides and mixtures of water soluble hydroxides, and water soluble hydroxides and mixtures of water soluble hydroxides mixed with gelling agent. Preferably the formation etching agent is selected from: hydrochloric acid, hydrofluoric acid, hydrochloric and hydrofluoric acid mixtures, hydrochloric acid mixed with gelling agent, hydrofluoric acid mixed with gelling agent, acetic acid, formic acid, acetic acid mixed with gelling agent, formic acid mixed with gelling agent, citric acid, alkali metal hydroxides and mixtures of alkali metal hydroxides, alkaline earth metal hydroxides and mixtures of alkaline earth metal hydroxides, lime and mixtures of lime with other basic metal oxides and hydroxides, alkali metal hydroxides and mixtures of alkali metal hydroxides mixed with gelling agent, alkaline earth metal hydroxides and mixtures of alkaline earth metal hydroxides mixed with gelling agent, lime and mixtures of lime with other basic metal oxides and hydroxides and gelling agent. The encapsulating agent should be selected so as to encapsulate said formation etching agent thus reducing the etching agents chemical reactivity with the formation until released so as to etch the fracture face in it's entirety. However just as important, the encapsulating agent should release said formation etching agent under predetermined conditions of temperature, pressure, pH, abrasion or combinations thereof. Encapsulating agents may include natural and synthetic oils, natural and synthetic polymers and enteric polymers and mixtures thereof. In one preferred embodiment, the encapsulating agent is selected from crosslinked vegetable oils, natural or synthetic polymers (such as polyvinylchloride and nylon), enteric polymers (such as acrylic resin polymers, cellulose acetate phthalate, carboxylated polymers, and the Eudragit polymer series), and mixtures thereof. So that the encapsulated formation etching agent can react with the upper portions of the fracture face, the combination of encapsulating agent and etching agent should have a density less than sand.

These and other features of the present invention are more fully set forth in the following description of illustrative embodiments of the invention.

DESCRIPTION OF ILLUSTRATIVE EMBODIMENTS

Generally the method of the present invention includes the process of acid fracturing or acid stimulation of a hydrocarbon bearing subterranean formation using an encapsulated formation etching agent. The hydrocarbon bearing subterranean formation should be in fluid communication with the surface by way of a well so that hydraulic pressure can be applied in order to induce fracturing and to enable the encapsulated formation etching agent to be pumped into the fracture. Once present in the fracture, the encapsulated formation etching agent is released under predetermined environmental conditions, such a temperature, pressure, pH, abrasion and other similar factors. Upon release the formation etching agent etches one or more the faces of the fracture in a conventional manner. Upon closing of the fracture, typically by release of the hydraulic pressure applied in forming the fracture, the faces of the fracture come together imperfectly and thus form flow channels within the formation. If properly conducted, the method of the present invention stimulates the productivity of the well by creating long flow channels within the formation thus increasing the flow of hydrocarbon. One of ordinary skill in the art of well stimulation should understand that the method of the present invention may be used in the stimulation of conventional vertical wells, directionally drilled wells or horizontally drilled wells.

Generally, the formation etching agent should be selected so as to be capable of chemically etching the face of the fracture created in the formation. The selection of the particular formation etching agent will necessarily depend upon the type of formation being acid fractured, the chemical composition of the rock in the formation and the porosity of the formation. In one embodiment the formation etching agent is selected from: mineral acids and mixtures thereof, organic acids and mixtures thereof, mineral acids and mixtures of mineral acids mixed with gelling agent, organic acids and mixtures of organic acids mixed with gelling agent, water soluble hydroxides and mixtures of water soluble hydroxides, and water soluble hydroxides and mixtures of water soluble hydroxides mixed with gelling agent. Preferably the formation etching agent is selected from: hydrochloric acid, hydrofluoric acid, hydrochloric and hydrofluoric acid mixtures, hydrochloric acid mixed with gelling agent, hydrofluoric acid mixed with gelling agent, acetic acid, formic acid, acetic acid mixed with gelling agent, formic acid mixed with gelling agent, citric acid, alkali metal hydroxides and mixtures of alkali metal hydroxides, alkaline earth metal hydroxides and mixtures of alkaline earth metal hydroxides, lime and mixtures of lime with other basic metal oxides and hydroxides, alkali metal hydroxides and mixtures of alkali metal hydroxides mixed with gelling agent, alkaline earth metal hydroxides and mixtures of alkaline earth metal hydroxides mixed with gelling agent, lime and mixtures of lime with other basic metal oxides and hydroxides and gelling agent. More preferably the formation etching agent is selected from solid organic acids such as citric acid, chloroacetic acid and other widely available solid organic acids.

The encapsulating agent should be selected so as to control the release of the etching agent within the fracture. This ability to predetermine the conditions under which the formation etching agent is released should allow for greater acid penetration distance. Release of the formation etching agent may be controlled by one or more different environmental parameters depending upon the encapsulating agent selected. Examples of such environmental parameters include pH, temperature, pressure or the physical crushing of the encapsulated formation etching agent. Equally important is that the encapsulating agent which should be selected so as to encapsulate the formation etching agent thus reducing chemical reactivity. Such a property facilitates the transport and use of the encapsulated formation etching agent at the well site. Thus the selection of the encapsulating agent should be made so as to reduce the chemical reactivity under certain predetermined conditions but also be capable of releasing the formation etching agent under predetermined conditions of temperature, pressure, pH or combinations thereof. Suitable encapsulating agents may include natural and synthetic oils, natural and synthetic polymers and enteric polymers and mixtures thereof. More specifically the encapsulating agent may be selected from enteric polymers, such as acrylic enamel or Eudragit E, Eudragit L or Eudragit S groups of polymer available from Rohm America or cellulose acetate phthalate or carboxylated polymers or mixtures of these may be utilized to encapsulate solid etching agent in a conventional manner by coating the powdered acid with the polymer in an agglomerator. Alternatively, liquid etching agent may be encapsulated in a manner similar to that utilized in the pharmaceutical industry.

A preferred and illustrative example of an encapsulating agent is an enteric polymer selected so as to become soluble under conditions of changing values of pH (e.g. release is promoted by a change from conditions of a first predetermined pH value to a second predetermined pH condition). Enteric polymers are commonly used in the pharmaceutical industry for the controlled release of drugs and other pharmaceutical agents over time. The use of enteric polymers allows for the controlled release of the formation etching agent under predetermined conditions of pH or pH and temperature. For example Eudragit E, Eudragit L or Eudragit S (available form Rohm America) are all enteric polymers the solubility of which depends upon the pH of the solution. In the case where pH alone is used to control release, the formation etching agent may be selected so as to be acidic and the enteric polymer selected so as to be more soluble under conditions of increasing pH. Thus as the pH increases in value (i.e. the solution becomes more neutral due to reaction of the acid with the fracture face) release of more etching agent is promoted by the change in pH value. In one preferred embodiment the enteric polymer encapsulated acid can be placed in an acidic carrier fluid. Thus as the acidic carrier fluid begins to etch the formation face, the pH value will become more towards neutral pH. In turn as the pH of the acidic carrier fluid increases (i.e. becomes more neutral), the enteric polymer encapsulation agent releases the etching agent into the carrier fluid causing a reduction in the pH of the carrier fluid and continue the etching process. This is sort of localized accelerated release could provide non-uniform etching of the formation face and thus create better flow channels.

Temperature is another environmental condition that has been found to especially useful in controlling the release of formation etching agents from the encapsulating agent. If controlled by temperature, the release temperature should be at or below the formation temperature. Thus one can temporarily cool the formation using well known techniques, inject the encapsulated formation etching agent and shut-in the well while the formation naturally returns to its "normal" temperature. In doing so, the release temperature will be reached thus releasing the formation etching agent. In some cases, uneven release may occur because certain portions of the formation will reach the release temperature faster than others. In such instances, an uneven etching of the formation opening face will occur generating more desirable flow channels. Preferably the release temperature is below about 200° F. and more preferably below about 130° F. One of skill in the art should know and appreciate the processes by which a well operator can control the temperature of the well bore and formation. For example, a well bore can be cooled by circulating large volumes of fluid through the tubing and well casing thus cooling the immediate surroundings of the casing. Such wellbore cooling and formation cooling procedures should prevent the premature release of the etching agent.

Regardless of the environmental condition controlling the release of the formation etching agent, the time for release should be more than 30 minutes. Such a time frame allows for the handling and pumping of the encapsulated formation etching agent into the formation. Preferably the time for release is about 60 to about 90 minutes.

In one embodiment the encapsulating agent is selected from natural and synthetic oils, natural and synthetic polymers and enteric polymers and mixtures thereof. Preferably the encapsulating agent is selected from crosslinked vegetable oils, natural or synthetic polymers (such as polyvinylchloride and nylon), enteric polymers (such as acrylic resin polymers, cellulose acetate phthalate, carboxylated polymers, and the Eudragit polymer series which are a proprietary aqueous methacrylic polymers available from Rohm, and mixtures thereof. The process of encapsulating the formation etching agent somewhat depends upon both the formation etching agent selected and the encapsulating agent. In one embodiment the encapsulation process involves the coating of solid organic acid (i.e. citric acid) with vegetable oil. One of skill in the art should be capable of accomplishing this by the combination of powdered citric acid and vegetable oil in an agglomerator or other similar devise that coats solid particles with a protective coating. Alternatively the formation etching agent can be encapsulated within polyvinylchloride or enteric polymers. There are many ways that those skilled in the art can encapsulate materials. Among these are in situ polymerization, interfacial polymerization, complex coacervation, polymer/polymer phase separation, desolvation, extrusion, thermal gelation, and ionic gelation.

One preferred embodiment is citric acid encapsulated in vegetable oil which is used as food additive in the aging of meat. The vegetable oil coated citric acid has well known and controlled release properties over time and is environmentally safe. In addition it is available in large quantities from commercial sources. Another preferred embodiment is citric acid coated with polyvinylchloride. Yet another preferred embodiment is the encapsulation of citric acid inside an enteric polymer. Yet another preferred embodiment is the encapsulation of HCL acid inside an enteric or nylon polymers.

As a practical matter, the granular nature of the encapsulated formation etching agent may require the use of a carrier fluid in order for it to be pumped downhole. Thus the mixture of the encapsulated formation etching agent with a suitable carrier fluid is referred to herein as a formation treating composition. Suitable carrier fluids should be selected so that they are compatible with the encapsulated formation etching agent. That is to say the carrier fluid should not cause the premature release of the encapsulated formation treating agent. It is also important that the carrier fluid be capable itself, or in combination with viscosifying or suspending agents, of forming a suspension of encapsulated formation etching agent. In addition, as a secondary role, the carrier fluid can also be an etching agent. However, the principle role of the carrier fluid, as stated above, is to permit the pumping of the encapsulated formation etching agent down hole. Thus the proportion of carrier fluid to encapsulated formation etching agent may vary considerably depending up the apparent viscosity desired. One of ordinary skill in the art should be capable to systematically vary the ratio of carrier fluid to encapsulated formation etching agent in order to achieve a combination that permits pumping downhole by conventional pumping systems.

As discussed above, the encapsulated formation etching agent should be capable of being suspended in a suitable carrier fluid. Suitable carrier fluids may include pad fluids, acidic fluids, drilling fluids and muds, brine solutions, oil based drilling fluids and other non-aqueous fluids utilized in the drilling of oil wells. The suitable carrier fluid may contain suspending and viscosifying agents such as bentonite clay, organophilic clay, polymeric suspending agents and the like which should be known to one of skill in the art to enhance the ability to suspend solids in solution. The suspension of the encapsulated formation etching agent is important because it allows the encapsulated formation etching agent to be suspended in the carrier fluid and pumped downhole. It is also important because it reduces the settling out of the encapsulated etching agent once it has been injected into the formation. It is preferred that the encapsulated formation etching agent has a density less than sand. Density of the combination should capable of being carried and not rapidly settle out. Further the encapsulated etching agent should be capable of being pumped downhole at a rate sufficient to conduct an acid fracture. Preferably the density should be less than that of sand.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

The following examples were carried out using commonly available laboratory equipment and techniques unless indicated otherwise. Commercially available chemicals were utilized where available from well known commercial suppliers. All experiments were carried out under ambient conditions unless noted otherwise.

EXAMPLE 1

Citric acid encapsulated in crosslinked vegetable oil. The encapsulated citric acid is commercially available from Balchem Corporation, Slate Hill, N.Y. In order to demonstrate the temperature dependent release of acid, the encapsulated citric acid was mixed with water (carrier fluid) and slowly heated. By monitoring the pH in a conventional manner, we found that the acid was released when a temperature of over 130° F. was reached and the water (carrier fluid) became acidic. When dolomite and limestone rock samples were exposed to this liquid, the etching process of the surface was immediate.

EXAMPLE 2

PVC encapsulated citric acid. The encapsulated citric acid is commercially available from Dow. In order to demonstrate the release of acid, the encapsulated citric acid was mixed with water (carrier fluid) and vigorously mixed. By monitoring the pH in a conventional manner, we found that the acid was released and the water (carrier fluid) became acidic. When dolomite and limestone rock samples were exposed to this liquid, the etching process of the surface was immediate. However, it was noted that the PVC encapsulated citric acid was more brittle which makes this material ideal for abrasive release in the created fracture.

EXAMPLE 3

Polymer encapsulated acid. Enteric polymers, such as acrylic enamel or Eudragit E, Eudragit L or Eudragit S groups of polymer available from Rohm America or cellulose acetate phthalate or carboxylated polymers or mixtures of these may be utilized to encapsulate citric acid in a conventional manner by coating the powdered acid with the polymer in an agglomerator. Alternatively, liquid acid may be encapsulated using conventional methods utilized in the pharmaceutical industry. In order to demonstrate the controlled release of acid, an ammonium based aqueous solution can be added to a mixture of the encapsulated acid in water (carrier fluid) thus increasing the pH of the solution to a point above which the encapsulating polymer becomes more soluble in solution. As a result of this increase in pH. the enteric polymer layer dissolved and acid will be released into the solution causing neutralization of the hydroxide ion present in solution thereby resulting in a decrease in pH.

In view of the above disclosure, one of ordinary skill in the art should understand and appreciate that one illustrative embodiment of the present invention includes a method of fracturing a subterranean formation, in which the subterranean formation is in fluid communication with the surface. The illustrative method includes the steps of: creating a fracture in the subterranean formation and injecting into the fracture an encapsulated formation etching agent. The encapsulated formation etching agent is composed of the etching agent and an encapsulating agent. The role of the formation etching agent is to etched the faces of the fracture so as to form a channel in the formation. The formation etching agent may included mineral acids and mixtures thereof, organic acids and mixtures thereof, mineral acids and mixtures of mineral acids mixed with gelling agent, organic acids and mixtures of organic acids mixed with gelling agent, water soluble hydroxides and mixtures of water soluble hydroxides, and water soluble hydroxides and mixtures of water soluble hydroxides mixed with gelling agent. In one preferred embodiment, the formation etching agent is selected from: hydrochloric acid, hydrofluoric acid, hydrochloric and hydrofluoric acid mixtures, hydrochloric acid mixed with gelling agent, hydrofluoric acid mixed with gelling agent, acetic acid, formic acid, acetic acid mixed with gelling agent, formic acid mixed with gelling agent, citric acid, alkali metal hydroxides and mixtures of alkali metal hydroxides, alkaline earth metal hydroxides and mixtures of alkaline earth metal hydroxides, lime and mixtures of lime with other basic metal oxides and hydroxides, alkali metal hydroxides and mixtures of alkali metal hydroxides mixed with gelling agent, alkaline earth metal hydroxides and mixtures of alkaline earth metal hydroxides mixed with gelling agent, lime and mixtures of lime with other basic metal oxides and hydroxides and gelling agent. The encapsulating agent should be selected so as to encapsulate the formation etching agent thus reducing chemical reactivity. It should also be selected so as to release the formation etching agent under predetermined conditions of temperature, pressure, pH or combinations thereof In one preferred embodiment, the encapsulating agent is selected from natural and synthetic oils, natural and synthetic polymers and enteric polymers and mixtures thereof. More preferably, the encapsulating agent is selected from crosslinked vegetable oils, natural or synthetic polymers (such as polyvinylchloride and nylon), enteric polymers (such as acrylic resin polymers, cellulose acetate phthalate, carboxylated polymers, and the Eudragit polymer series), and mixtures thereof. It is preferred that the encapsulated formation etching agent has a density less than sand so that it may be readily suspended in a carrier fluid and pumped downhole and into the formation as a slurry.

Another illustrative embodiment of the present invention includes a method of acid fracturing a subterranean formation in which subterranean formation is in fluid communication with the surface. The illustrative embodiment may include: injecting into the formation a pad fluid under sufficient hydraulic pressure to create an open fracture in the formation; injecting into the open fracture an encapsulated formation etching agent; etching the faces of the open fracture and releasing the hydraulic pressure on the formation so as to close the open fracture thus forming one or more flow channels in the formation defined by the etched fracture faces. The formation etching agent should be capable of etching the fracture faces of the formation so as to give one or more etched fracture faces. Preferably the etching takes place in a non-uniform manner so that upon closing of the fracture a flow channel forms. Depending upon the characteristics of the rock in the formation, the formation etching agent may include mineral acids and mixtures thereof, organic acids and mixtures thereof, mineral acids and mixtures of mineral acids mixed with gelling agent, organic acids and mixtures of organic acids mixed with gelling agent, water soluble hydroxides and mixtures of water soluble hydroxides, and water soluble hydroxides and mixtures of water soluble hydroxides mixed with gelling agent. In one preferred embodiment, the formation etching agent is selected from: hydrochloric acid, hydrofluoric acid, hydrochloric and hydrofluoric acid mixtures, hydrochloric acid mixed with gelling agent, hydrofluoric acid mixed with gelling agent, acetic acid, formic acid, acetic acid mixed with gelling agent, formic acid mixed with gelling agent, citric acid, alkali metal hydroxides and mixtures of alkali metal hydroxides, alkaline earth metal hydroxides and mixtures of alkaline earth metal hydroxides, lime and mixtures of lime with other basic metal oxides and hydroxides, alkali metal hydroxides and mixtures of alkali metal hydroxides mixed with gelling agent, alkaline earth metal hydroxides and mixtures of alkaline earth metal hydroxides mixed with gelling agent, lime and mixtures of lime with other basic metal oxides and hydroxides and gelling agent. As discussed above, the encapsulating agent is selected so as to encapsulate the formation etching agent thus reducing chemical reactivity of the formation etching agent. However the encapsulating agent should be selected so as to release the formation etching agent under predetermined conditions of temperature, pressure, pH or combinations thereof. The encapsulating agent may included natural and synthetic oils, natural and synthetic polymers and enteric polymers and mixtures thereof. Preferably the encapsulating agent is selected from crosslinked vegetable oils, natural or synthetic polymers (such as polyvinylchloride and nylon), enteric polymers (such as acrylic resin polymers, cellulose acetate phthalate, carboxylated polymers, and the Eudragit polymer series), and mixtures thereof.

Yet another illustrative embodiment of the present invention is a method of increasing the production of hydrocarbon fluids from a hydrocarbon fluid bearing subterranean formation in which the formation is in fluid communication with the surface by way of a well. The illustrative method includes injecting into the formation a fluid via the well and pressurizing the fluid so as to create at least one open fracture in the subterranean formation, the fractures having one or more fracture faces. The method further includes injecting into the open fracture a formation treating composition, the formation treating composition including an encapsulated formation etching agent and shutting-in the well for a sufficient time so as to allow the encapsulated formation treating agent to be released from the encapsulating agent thus etching the fracture faces and giving etched fracture faces. The hydraulic pressure applied to the well may then be release by depresurizing the fluid so as to close the open fractures thus forming one or more flow channels defined by the etched fracture faces in the formation. The flow channels serve to increase the production of hydrocarbon fluids from the hydrocarbon fluid bearing subterranean formation. It is preferred in this illustrative embodiment that the formation etching agent be selected from: mineral acids and mixtures thereof, organic acids and mixtures thereof, mineral acids and mixtures of mineral acids mixed with gelling agent, organic acids and mixtures of organic acids mixed with gelling agent, water soluble hydroxides and mixtures of water soluble hydroxides, and water soluble hydroxides and mixtures of water soluble hydroxides mixed with gelling agent. In a more preferred embodiment, the formation etching agent is selected from: hydrochloric acid, hydrofluoric acid, hydrochloric and hydrofluoric acid mixtures, hydrochloric acid mixed with gelling agent, hydrofluoric acid mixed with gelling agent, acetic acid, formic acid, acetic acid mixed with gelling agent, formic acid mixed with gelling agent, citric acid, alkali metal hydroxides and mixtures of alkali metal hydroxides, alkaline earth metal hydroxides and mixtures of alkaline earth metal hydroxides, lime and mixtures of lime with other basic metal oxides and hydroxides, alkali metal hydroxides and mixtures of alkali metal hydroxides mixed with gelling agent, alkaline earth metal hydroxides and mixtures of alkaline earth metal hydroxides mixed with gelling agent, lime and mixtures of lime with other basic metal oxides and hydroxides and gelling agent. The encapsulating agent should be selected so as to encapsulate the above described formation etching agent thus reducing the formation etching agents chemical reactivity. However, the encapsulating agent should also be selected such that the formation etching agent is released under predetermined conditions of temperature, pressure, pH, abrasion or combinations thereof. Taking these criteria into account, the encapsulating agent may be selected from natural and synthetic oils, natural and synthetic polymers and enteric polymers and mixtures thereof. In one preferred embodiment, the encapsulating agent is from vegetable oil, polyvinylchloride, other polymers (such as nylon), enteric polymers such as cellulose acetate phthalate (CAP) polymers, and mixtures thereof.

The illustrative embodiments of the present invention also include compositions useful in the methods described above. Thus the present invention encompasses a composition of matter useful in formation of flow channels in the faces of a fractured subterranean formation. The illustrative composition should be minimally composed of an encapsulating agent, and a formation etching agent. The formation etching agent should be capable of chemically etching the faces of a fractured subterranean formation. Thus the formation etching agent may be selected from: mineral acids and mixtures thereof, organic acids and mixtures thereof, mineral acids and mixtures of mineral acids mixed with gelling agent, organic acids and mixtures of organic acids mixed with gelling agent, water soluble hydroxides and mixtures of water soluble hydroxides, and water soluble hydroxides and mixtures of water soluble hydroxides mixed with gelling agent. Preferably the formation etching agent is selected from: hydrochloric acid, hydrofluoric acid, hydrochloric and hydrofluoric acid mixtures, hydrochloric acid mixed with gelling agent, hydrofluoric acid mixed with gelling agent, acetic acid, formic acid, acetic acid mixed with gelling agent, formic acid mixed with gelling agent, citric acid, alkali metal hydroxides and mixtures of alkali metal hydroxides, alkaline earth metal hydroxides and mixtures of alkaline earth metal hydroxides, lime and mixtures of lime with other basic metal oxides and hydroxides, alkali metal hydroxides and mixtures of alkali metal hydroxides mixed with gelling agent, alkaline earth metal hydroxides and mixtures of alkaline earth metal hydroxides mixed with gelling agent, lime and mixtures of lime with other basic metal oxides and hydroxides and gelling agent. The encapsulating agent should be selected so as to encapsulate the formation etching agent thus reducing the chemical reactivity of the formation etching agent. The encapsulating agent should also be selected so as to release the formation etching agent under the conditions of temperature, pressure, pH or combinations thereof present in the subterranean formation. Taking these criteria into account, the encapsulating agent may be selected from natural and synthetic oils, natural and synthetic polymers and enteric polymers and mixtures thereof. In one preferred embodiment, the encapsulating agent is selected from crosslinked vegetable oils, natural or synthetic polymers (such as polyvinylchloride and nylon), enteric polymers (such as acrylic resin polymers, cellulose acetate phthalate, carboxylated polymers, and the Eudragit polymer series), and mixtures thereof. In one illustrative embodiment, the combination of the encapsulating agent and the formation etching agent should be capable of being suspended in a carrier liquid and pumped down hole. It is preferred that the encapsulated formation etching agent have a density less than that of sand so that it is capable of being suspended by conventional suspending agents.

While the compositions and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A method of fracturing a subterranean formation, said subterranean formation being in fluid communication with the surface, said method comprising:
   creating a fracture in said subterranean formation, said fracture having more than one fracture faces; and
   injecting into said fracture an encapsulated formation etching agent, wherein said encapsulated formation etching agent includes a formation etching agent and an encapsulating agent and wherein said formation etching agent etches the fracture faces of the fracture so as to form a flow channel in said formation.

2. The method of claim 1 wherein the formation etching agent is selected from: mineral acids and mixtures thereof, organic acids and mixtures thereof, mineral acids and mixtures of mineral acids mixed with gelling agent, organic acids and mixtures of organic acids mixed with gelling agent, water soluble hydroxides and mixtures of water soluble hydroxides, and water soluble hydroxides and mixtures of water soluble hydroxides mixed with gelling agent.

3. The method of claim 2 wherein the formation etching agent is selected from: hydrochloric acid, hydrofluoric acid, hydrochloric and hydrofluoric acid mixtures, hydrochloric acid mixed with gelling agent, hydrofluoric acid mixed with gelling agent, acetic acid, formic acid, acetic acid mixed with gelling agent, formic acid mixed with gelling agent, citric acid, alkali metal hydroxides and mixtures of alkali metal hydroxides, alkaline earth metal hydroxides and mixtures of alkaline earth metal hydroxides, lime and mixtures of lime with other basic metal oxides and hydroxides, alkali metal hydroxides and mixtures of alkali metal hydroxides mixed with gelling agent, alkaline earth metal hydroxides and mixtures of alkaline earth metal hydroxides mixed with gelling agent, lime and mixtures of lime with other basic metal oxides and hydroxides and gelling agent.

4. The method of claim 1 wherein the encapsulating agent is selected so as to encapsulate said formation etching agent thus reducing chemical reactivity and so as to release said formation etching agent under predetermined conditions of temperature, pressure, pH, abrasion or combinations thereof.

5. The method of claim 4 wherein the encapsulating agent is selected from natural and synthetic oils, natural and synthetic polymers and enteric polymers and mixtures thereof.

6. The method of claim 1 wherein the encapsulated formation etching agent has a density less than sand.

7. A method of acid fracturing a subterranean formation, said subterranean formation being in fluid communication with the surface, said method comprising:
   injecting into said formation a pad fluid, said pad fluid being under a hydraulic pressure sufficient to create an open fracture in said formation, said open fracture having one or more fracture faces;
   injecting into said open fracture an encapsulated formation etching agent, said encapsulated formation etching agent including a formation etching agent being encapsulated by an encapsulating agent, wherein said formation etching agent is capable of etching the fracture faces of said formation;
   etching the fracture faces with said formation etching agent so as to give one or more etched fracture faces; and
   releasing the hydraulic pressure on the formation so as to close the open fracture thus forming one or more flow channels, said flow channels being defined by the etched fracture faces.

8. The method of claim 7 wherein the formation etching agent is selected from: mineral acids and mixtures thereof, organic acids and mixtures thereof, mineral acids and mixtures of mineral acids mixed with gelling agent, organic acids and mixtures of organic acids mixed with gelling agent, water soluble hydroxides and mixtures of water soluble hydroxides, and water soluble hydroxides and mixtures of water soluble hydroxides mixed with gelling agent.

9. The method of claim 8 wherein the formation etching agent is selected from: hydrochloric acid, hydrofluoric acid, hydrochloric and hydrofluoric acid mixtures, hydrochloric acid mixed with gelling agent, hydrofluoric acid mixed with gelling agent, acetic acid, formic acid, acetic acid mixed with gelling agent, formic acid mixed with gelling agent, citric acid, alkali metal hydroxides and mixtures of alkali metal hydroxides, alkaline earth metal hydroxides and mixtures of alkaline earth metal hydroxides, lime and mixtures of lime with other basic metal oxides and hydroxides, alkali metal hydroxides and mixtures of alkali metal hydroxides mixed with gelling agent, alkaline earth metal hydroxides and mixtures of alkaline earth metal hydroxides mixed with gelling agent, lime and mixtures of lime with other basic metal oxides and hydroxides and gelling agent.

10. The method of claim 7 wherein the encapsulating agent is selected so as to encapsulate said formation etching agent thus reducing chemical reactivity and so as to release said formation etching agent under predetermined conditions of temperature, pressure, pH, abrasion or combinations thereof.

11. The method of claim 10 wherein the encapsulating agent is selected from natural and synthetic oils, natural and synthetic polymers and enteric polymers and mixtures thereof.

12. The method of claim 7 wherein the encapsulated formation etching agent has a density less than sand.

13. A method of increasing the production of hydrocarbon fluids from a hydrocarbon fluid bearing subterranean formation, said formation being in fluid communication with the surface by way of a well, said method comprising:
   injecting into said formation a pad fluid by way of said well;
   pressurizing said pad fluid so as to create open fractures in said subterranean formation, said fractures having one or more fracture faces;
   injecting into said open fractures a formation treating composition, said formation treating composition including an encapsulated formation etching agent and a carrier fluid, said encapsulated formation etching agent including a formation etching agent being encapsulated by an encapsulating agent and wherein said formation etching agent being capable of etching the fracture faces of said formation;
   shutting-in said well for a sufficient time so as to allow said formation treating agent to be released from said encapsulating agent thus etching said fracture faces and giving etched fracture faces; and
   depresurizing said fluid so as to close the open fractures thus forming one or more flow channels, said flow channels being defined by the etched fracture faces, wherein said flow channels increase the production of hydrocarbon fluids from said hydrocarbon fluid bearing subterranean formation.

14. The method of claim 13 wherein the formation etching agent is selected from: mineral acids and mixtures thereof, organic acids and mixtures thereof, mineral acids and mixtures of mineral acids mixed with gelling agent, organic acids and mixtures of organic acids mixed with gelling agent, water soluble hydroxides and mixtures of water soluble hydroxides, and water soluble hydroxides and mixtures of water soluble hydroxides mixed with gelling agent.

15. The method of claim 14 wherein the formation etching agent is selected from: hydrochloric acid, hydrofluoric acid, hydrochloric and hydrofluoric acid mixtures, hydrochloric acid mixed with gelling agent, hydrofluoric acid mixed with gelling agent, acetic acid, formic acid, acetic acid mixed with gelling agent, formic acid mixed with gelling agent, citric acid, alkali metal hydroxides and mixtures of alkali metal hydroxides, alkaline earth metal hydroxides and mixtures of alkaline earth metal hydroxides, lime and mixtures of lime with other basic metal oxides and hydroxides, alkali metal hydroxides and mixtures of alkali metal hydroxides mixed with gelling agent, alkaline earth metal hydroxides and mixtures of alkaline earth metal hydroxides mixed with gelling agent, lime and mixtures of lime with other basic metal oxides and hydroxides and gelling agent.

16. The method of claim 13 wherein the encapsulating agent is selected so as to encapsulate said formation etching agent thus reducing chemical reactivity and so as to release said formation etching agent under predetermined conditions of temperature, pressure, pH, abrasion or combinations thereof.

17. The method of claim 16 wherein the encapsulating agent is selected from natural and synthetic oils, natural and synthetic polymers and enteric polymers and mixtures thereof.

18. The method of claim 13 wherein the encapsulated formation etching agent has a density less than sand.

* * * * *